Aug. 11, 1925.

C. H. SPENCER 1,549,030

METHOD AND MEANS FOR HANDLING SUBAQUATIC DEPOSITS

Filed Jan. 15, 1924    3 Sheets-Sheet 1

Inventor.
CHARLES H. SPENCER.
BY Hazard and Miller
Attorneys.

Witness:
W. H. Hall.

Aug. 11, 1925.  
C. H. SPENCER  
1,549,030  
METHOD AND MEANS FOR HANDLING SUBAQUATIC DEPOSITS  
Filed Jan. 15, 1924     3 Sheets-Sheet 2
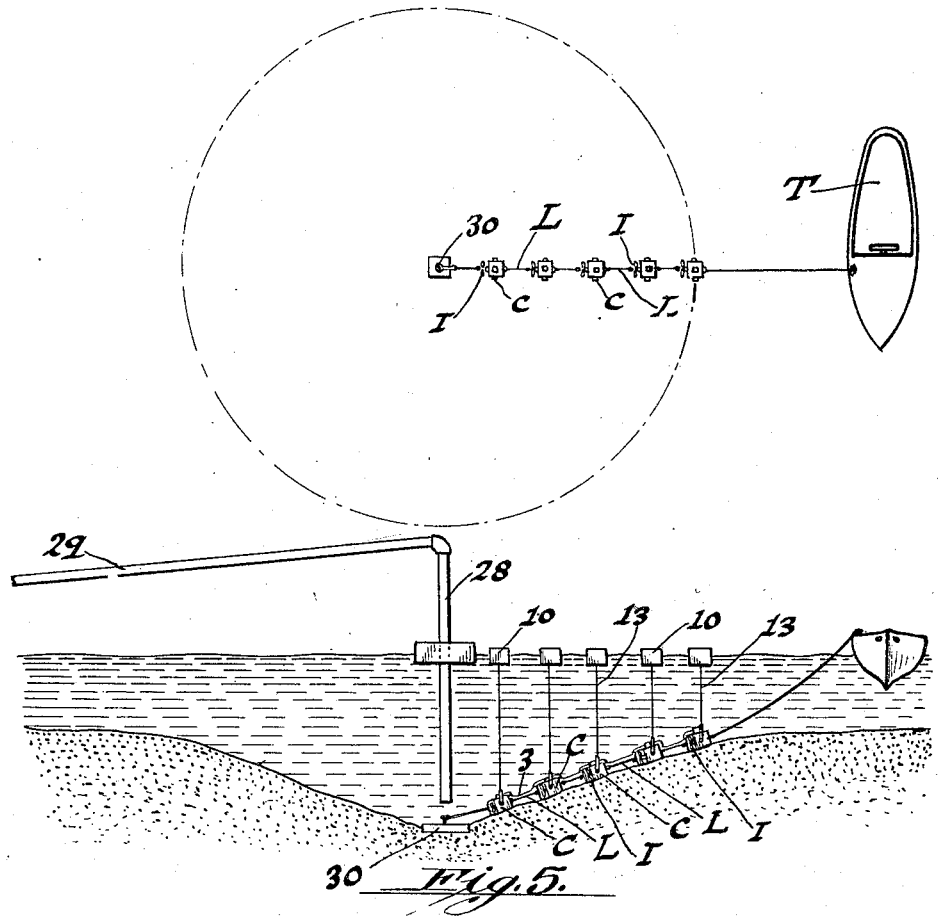

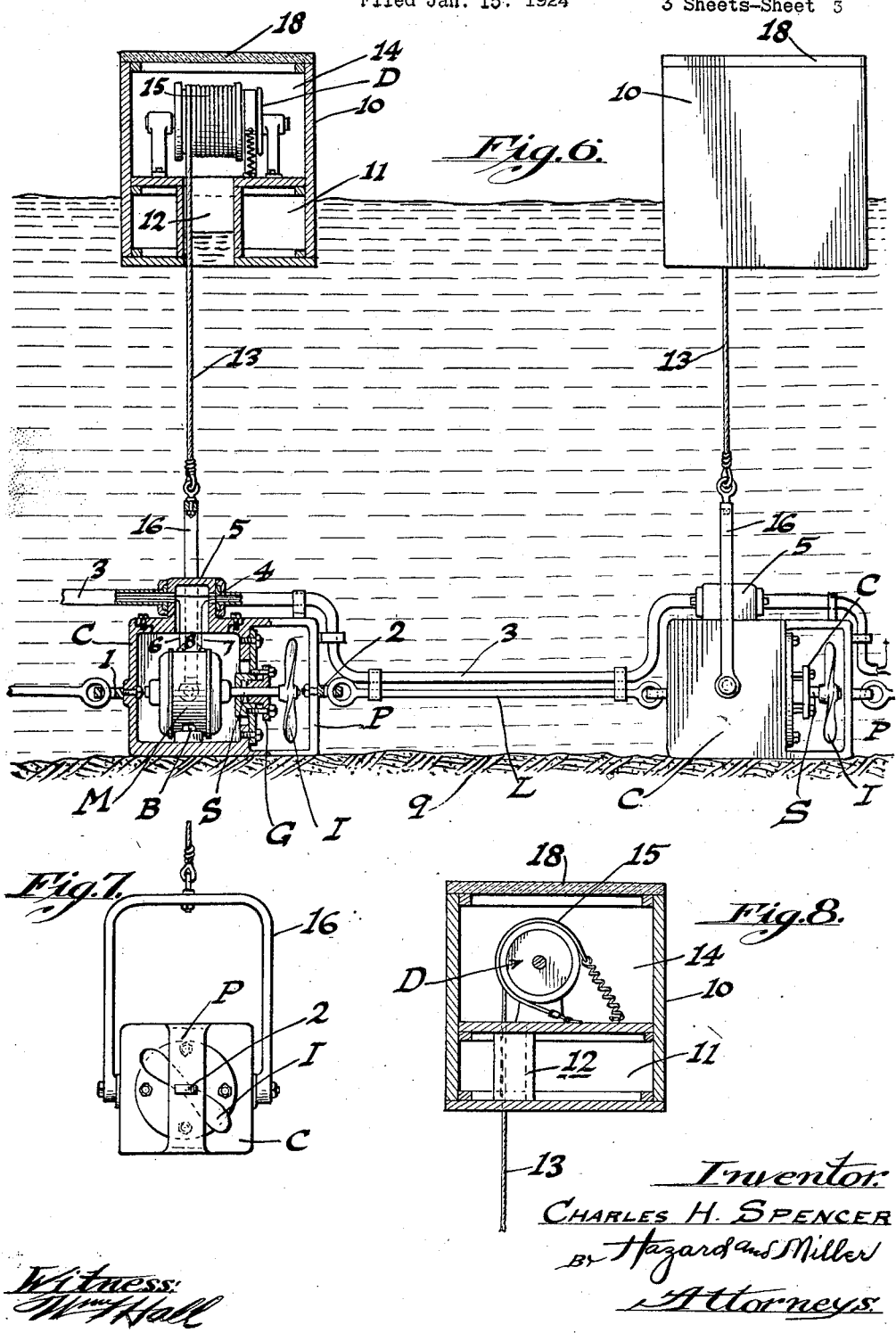

Patented Aug. 11, 1925.

1,549,030

UNITED STATES PATENT OFFICE.

CHARLES H. SPENCER, OF LOS ANGELES, CALIFORNIA.

METHOD AND MEANS FOR HANDLING SUBAQUATIC DEPOSITS.

Application filed January 15, 1924. Serial No. 686,337.

*To all whom it may concern:*

Be it known that I, CHARLES H. SPENCER, a citizen of the United States, residing at Los Angeles, in the county of Los Angeles and State of California, have invented new and useful Improvements in Methods and Means for Handling Subaquatic Deposits, of which the following is a specification.

My present invention being referred to as a method and means for handling subaquatic deposits, it may be understood to be an object of this invention to provide means suitable for use in the freeing of harbors, channels, slips, reservoirs, and the like, from silt or sand and other sedimentary or loose materials deposited or accumulating therein.

Broadly, it is an object of this invention to provide means for the removal or transport of solid sedimentary materials, or the like, by the artificial production of currents in natural or artificial bodies of water; and my preferred means for the production of such currents may comprise a series of motors, such as electric motors, suitably encased and connected in a desired relationship to one another and to the materials which are to be transported by the motion thereof.

It is an object of this invention to provide means comprising a plurality of submerged impellers, such as screw impellers mounted upon rotary shafts and supported either from the bottom or from the top surface of a body of water, to produce a relative circulation, and preferably a comparatively mild but continuous circulation therein and in a predetermined direction; and in a preferred embodiment of my invention the shafts of the mentioned impellers may be flexibly retained in a desired lineal relationship by means comprising links or rods, and the mentioned links or rods may optionally be employed to support conductive elements by which the respective motors employed to drive said shafts may be connected in a suitable electric circuit.

It is a further object of this invention to provide means whereby a series of suitably encased electric motors provided with separate impellers and connected in the manner described may be supported wholly or in part from floats, or whereby floats may be utilized in determining the location of such motors; and a preferred embodiment of my invention may comprise floats serving additionally as housings for retrieving means adapted to cooperate in obviating the risk of entanglement of connecting cords, or the like, in the mentioned impellers.

It is a further object of this invention to provide means and methods suitable for use either as a comparatively fixed and permanent installation to maintain a predetermined level or configuration of a slip or channel, or the like, or capable of use, as by anchoring one end of a series of motors and dragging said series around a central anchor as by means of a tug, or the like, in deepening the bottom of a harbor, or maintaining the same at a predetermined level, or in the recovery of sand, or the like, from beneath a body of water, for structural or other uses; and in either of the embodiments of my invention referred to and especially in those embodiments in which sand or like materials are moved from various directions toward a central point, I may associate with the mentioned series of motors any suitable means, such as an air-lift, for the complete withdrawal, from beneath a body of water, of sand or other sedimentary material brought thereto.

Other objects of my invention will appear from the following description of specific embodiments thereof, and from the appended claims, taken in connection with the accompanying drawings in which, Fig. 1 is a diagrammatic plan view of an installation exhibiting my invention as the same might be employed in the collecting of sediments from a comparatively wide area, such as a harbor, and in the delivery thereof through comparatively restricted channel, such as a harbor outlet.

Figs. 2 and 3 are respectively vertical sectional or elevational views showing a possible use of my novel means and method of transportation in bringing a subaquatic surface to a substantially uniform level, the separate motors employed in this case being shown as suspended from floats.

Figs. 4 and 5 are respectively plan and elevational views showing diagrammatically a possible mode of employing my invention in the clearing of a circular area or in the recovery of sedimentary materials from a circular area by means comprising a series of separate submerged motors dragged in substantially circular paths by independent means such as a tug boat; and Fig. 5 suggests additionally the possible use of an airlift, or the like, for the removal of sedimentary material so collected.

Fig. 6 is an elevational view, partly in section, showing certain proposed details of construction which may advantageously be employed in a system of the character above referred to.

Fig. 7 is a separate rear-end view of a single motor suitable for use in the practice of my invention and provided with means not only for connection with like motors but for connection with overhead locating or positioning means, such as a buoy.

Fig. 8 is a vertical section through a buoy provided with retrieving or elevation controlling means, as hereinafter referred to.

Figure 1:
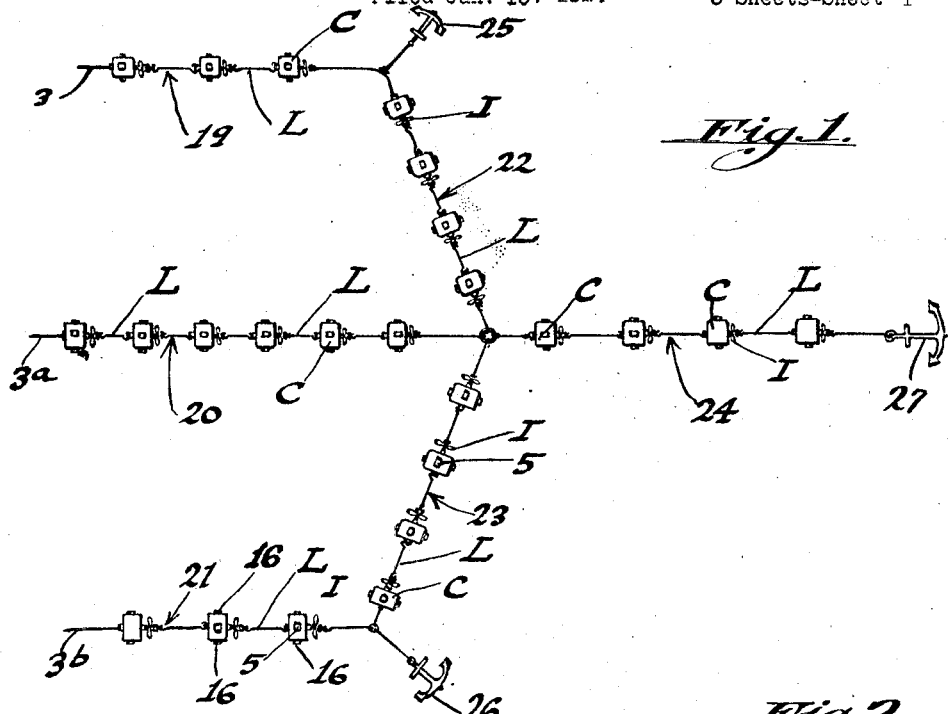

Referring to the details of that specific embodiment of my invention chosen for purposes of illustration in Figs. 6, 7 and 8, M may be an electrical motor secured as by bolts B within a water-tight housing or casing C, shown as provided with a gland G, through which extends the shaft S of an impeller blade I, shown as protected by a guard P, integral with the mentioned casing C.

In order to provide a flexible connection between a plurality of motors of the general character referred to, I may employ means such as chains or rods or links L, shown as engaging eye-bolts 1 and 2, positioned respectively in what I may term the front end of the casing C and the mentioned protecting or guard element P; and I may employ the links L, or their equivalent, not only to maintain a desired mechanical connection or spatial relationship between a plurality of motors but also to carry cables 3, or their equivalent, shown as secured at their ends 4 in water-tight connection with an upwardly extension or outlet box 5, upon each motor casing C, through which the circuit wires 6, 7 may be led to posts 8, of a usual character, upon the motors M, which may be connected in series, as suggested in Fig. 6, or otherwise, according to circumstances and conditions of use, one end of the cable 3 being preferably carried inshore and connected with any suitable source of current not shown.

Although a series of motors of the general character referred to may be permitted to rest upon the sand or silt or other material 9, at the bottom of a body of water, the operation of the motors then tending either to maintain the level of said bottom or gradually to cut the same away, I may optionally associate with the parts referred to any suitable means for determining or predetermining the location or elevation thereof; and for the purpose last referred to, I have somewhat diagrammatically indicated the employment of buoys 10, comprising a plurality of chambers, such as a lower chamber 11, provided with a vertical passage 12 to permit of a relative movement of a connecting cord 13 therethrough, which is wound around a drum D located in a chamber 14, and is provided with a tension band 15 adapted to take up slack in the cord 13, extending downwardly to a casing C or to a bail 16, or its equivalent, shown as pivotally connected at 17 to the lateral vertical surfaces of said casing.

By means of the general character referred to, I may obviate the necessity for searching to find a motor or series of motors connected and employed beneath the surface of a body of water; and I may also, as by suitably connecting or adjusting the length of the cord 13, provide means limiting the descent of a motor or series of motors, keeping the same at or about a predetermined level and at a predetermined angle of inclination, as may be favorable to the establishment of a desired level beneath a body of water; and in any event, a buoy or buoys connected in the manner described, or in any other suitable manner tending to produce an upward tension on the cords 13, or their equivalent, may serve to prevent the entanglement of said cords in the impellers 13, or in other parts of the organization disclosed.

As suggested in Fig. 6, I may optionally provide the buoys 10, or their equivalent, with removable covers 18; and these covers may advantageously be not only air-tight, to prevent a free upward movement of water through the passage 12, but they may advantageously be formed fully or partly of transparent material, permitting a ready inspection of the drums D therein, as may be convenient for the approximate ascertainment of the level of a motor by an inspection of the drum of the retriever.

As suggested in Fig. 1, a series of motors, within separate casings C, may be connected in trains or series of any desired length and arranged either in a single series or in divergent and interconnected series, and anchored, as in proximity to a harbor mouth, in such manner as to maintain a desired depth therein, the parallel series 19, 20 and 21 being shown as connected by diagonal series 22, 23 with a single terminal series 24, which may extend outward through a channel entrance and handle the combined or total deposits delivered by the respective series 19—23 inclusive, all positioned within a harbor, the entire system being retained in its intended position by means such as the lateral anchors 25 and 26 and the terminal anchor 27, additional anchors being used as required, and the inner ends of the cables 3, 3ª, 3ᵇ being connected with any suitable source of electrical current.

Figure 2:
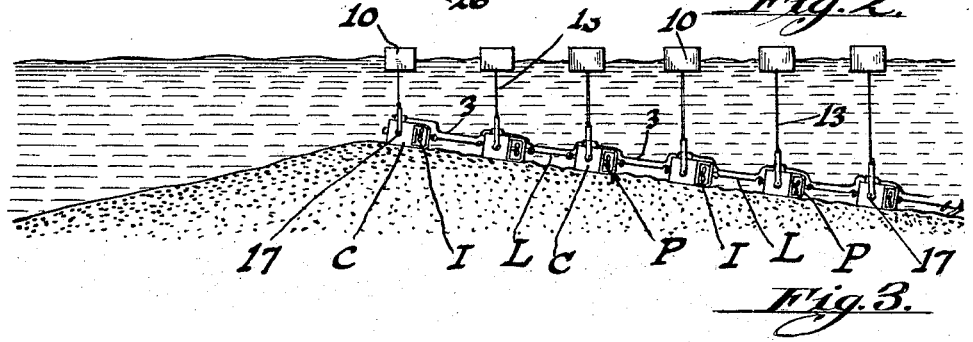
Figure 3:
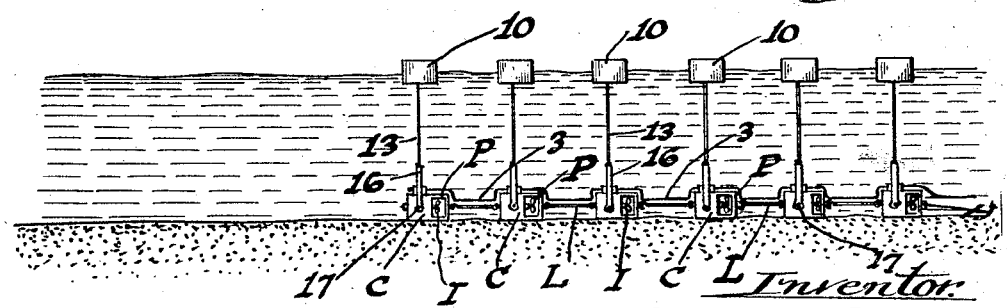

In the embodiment of my invention illustrated in Figs. 2 and 3, I have suggested the employment of floats or buoys 10 in connection with a series of anchors encased in the manner described and so interconnected as temporarily to restrain the descent of intermediate motors, although maintaining an alignment thereof favorable not only to a cooperative effect in the advancing of sedimentary materials but also to the filling of depressions and the establishment of a substantially uniform level, a final result of the operation of such a series of motors being suggested in Fig. 3.

In Figs. 4 and 5 I have somewhat diagrammatically indicated the possibility and mode of employing a series of suitably encased and connected motors in sweeping sedimentary material to or from a central point in a substantially circular area, floats 10 being optionally employed to indicate or maintain the position of the same, and means such as a tug T being employed to impart a circular sweeping movement to an entire series of encased motors pivoted at a central point 30. When an organization of the type last referred to is to be employed in removing sediment from a reservoir or harbor, or when such an organization is employed for the recovery of sand or mud or other sedimentary materials, I may optionally associate therewith additional and cooperating means such as an air lift 21, shown diagrammatically as supported above the central pivot 28, and as provided with a lateral conduit 29, through which the recovered materials may be delivered in any manner desired.

It will be understood that the foregoing are merely illustrative embodiments of the inventions upon which protection is herein sought, and that various features of my invention are capable of independent use, and also that various modifications might easily be devised by those skilled in the art, without the slightest departure from the spirit and scope of my invention, as the same is indicated above and in the following claims.

What I claim is:

1. In a system for the handling of subaquatic deposits, a plurality of submerged encased motors provided with exposed impellers.

2. In a system for the handling of subaquatic deposits, a plurality of submerged encased motors provided with exposed impellers, said motors being provided with mechanical connecting means.

3. In a system for the handling of subaquatic deposits, a plurality of submerged encased motors provided with exposed impellers, said motors being provided with mechanical connecting means supporting electrical connecting means.

4. In a system for the handling of subaquatic deposits, a plurality of submerged encased motors provided with exposed impellers, some of said motors being connected with separate floats.

5. In a system for the handling of subaquatic deposits, a plurality of submerged encased motors provided with exposed impellers, some of said motors being connected with separate floats provided with retrieving means.

6. In a system for the handling of subaquatic deposits, a plurality of submerged encased motors provided with exposed impellers, some of said motors being provided with anchoring means.

7. In a system for the handling of subaquatic deposits, a plurality of submerged encased motors provided with exposed impellers, some of said motors being provided with upwardly extending handling or locating means.

8. In a system for the handling of subaquatic deposits, a plurality of submerged encased motors provided with exposed impellers, some of said motors being provided with means for predetermining the position thereof relatively to the surface of a body of water.

9. In a system for the handling of subaquatic deposits, a plurality of submerged encased motors provided with exposed impellers and with connecting means.

10. In a system for the handling of subaquatic deposits, a plurality of submerged encased motors provided with exposed impellers, the casings of said motors being provided with connecting means.

11. In a system for the handling of subaquatic deposits, a plurality of submerged encased motors provided with exposed impellers, the casings of some of said motors being provided with means for securing the same to floats.

12. In a system for the handling of subaquatic deposits, a plurality of submerged encased motors provided with exposed impellers, the casings of some of said motors being provided with means for securing the same to floats by pivotal connecting means.

13. A method of handling subaquatic deposits which comprises supporting in serial relationship separate encased motors respectively provided with exposed impellers.

14. A method of handling subaquatic deposits which comprises supporting in serial relationship separate encased motors respectively provided with exposed impellers and imparting a translatory movement by said series of impellers.

15. A method of handling subaquatic deposits which comprises supporting in serial relationship separate encased motors respectively provided with exposed impellers and imparting a translatory movement by said series of impellers and withdrawing by additional means the deposits collected thereby.

16. The method of handling subaquatic deposits which consists of rotating an impeller adjacent the deposit about an axis substantially parallel to the upper surface of said deposit.

17. The method of handling subaquatic deposits which consists of rotating an impeller adjacent the deposit about an axis substantially parallel to the upper surface of said deposit, and moving said impeller over said deposit.

18. The method of handling subaquatic deposits which consists of rotating an impeller over the deposit about an approximately horizontal axis.

19. The method of handling subaquatic deposits which consists of rotating an impeller over the deposit about an approximately horizontal axis, and moving said impeller over said deposit.

In testimony whereof I have signed my name to this specification.

CHARLES H. SPENCER.